Nov. 2, 1926.　　　　　　　　　　　　　　　　　　　　　　　　1,605,363
A. F. MASURY ET AL
CUSHION CONNECTION FOR VEHICLE CONSTRUCTION
Filed August 28, 1925　　　3 Sheets-Sheet 1
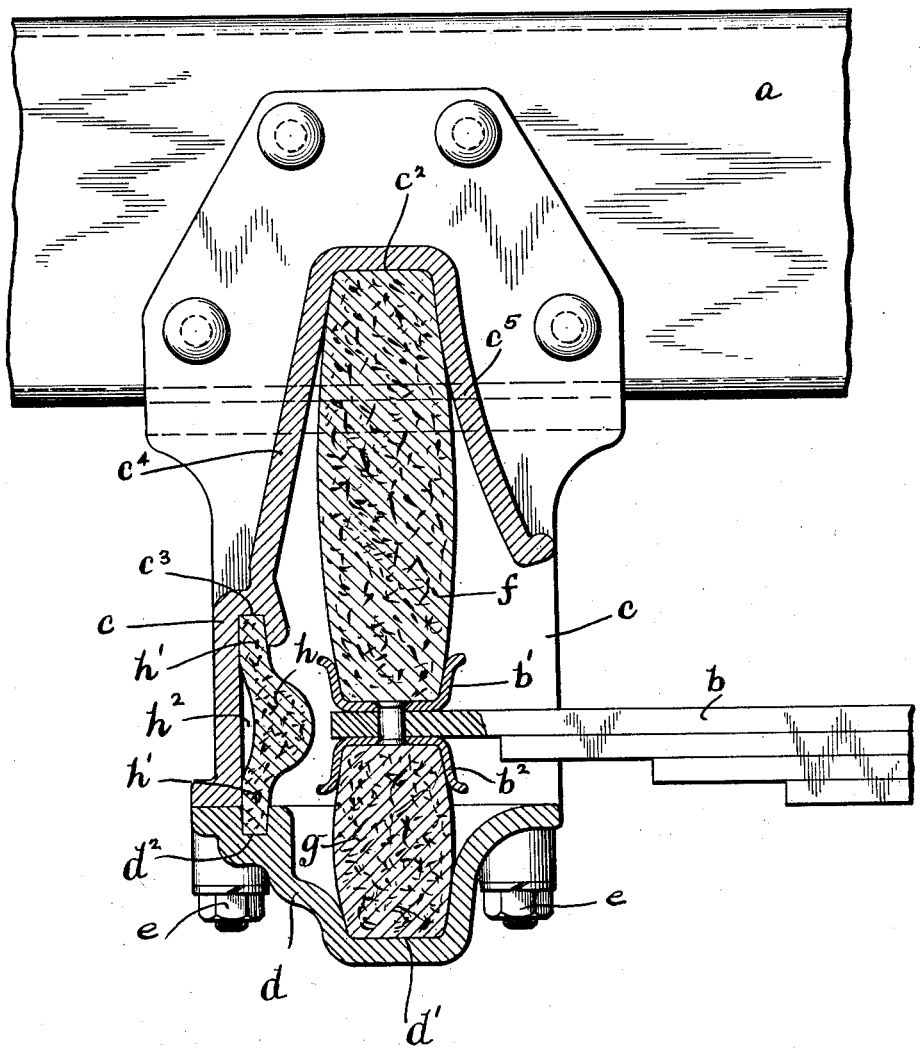
Fig. 1,
Inventors
ALFRED F. MASURY
CHARLES FROESCH
By their Attorneys
Redding, Greeley, O'Shea & Campbell.

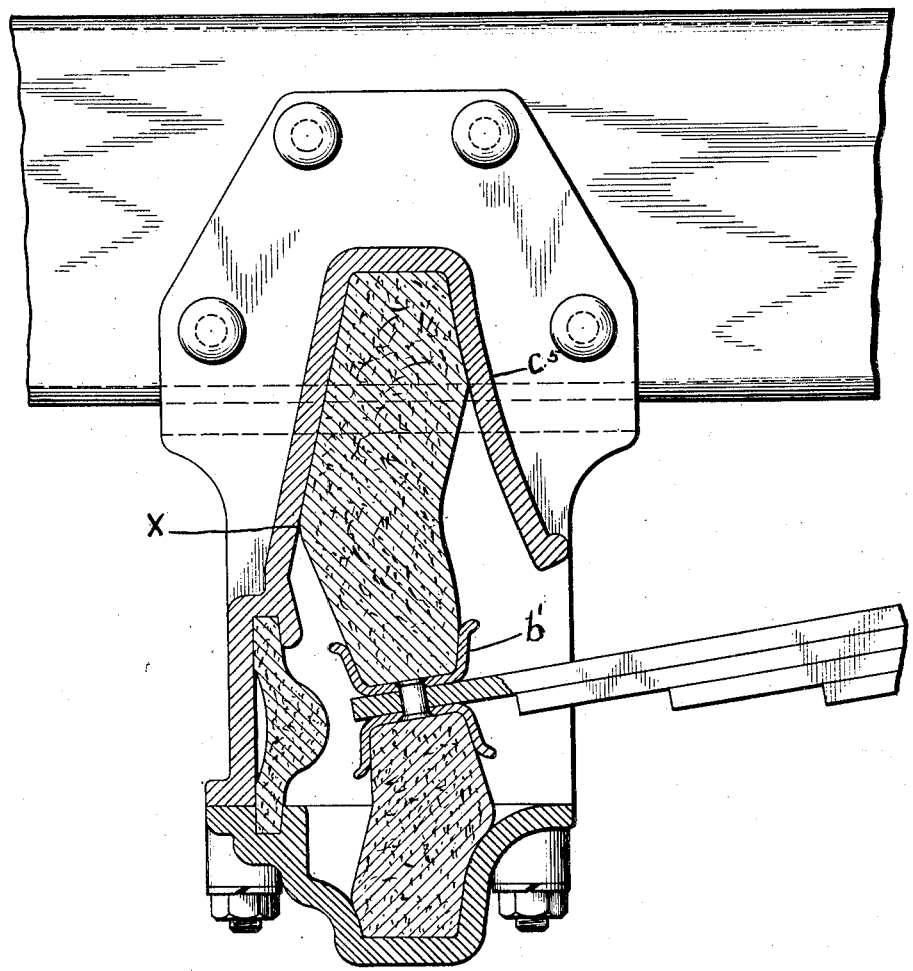

Nov. 2, 1926. 1,605,363
A. F. MASURY ET AL
CUSHION CONNECTION FOR VEHICLE CONSTRUCTION
Filed August 28, 1925   3 Sheets-Sheet 3
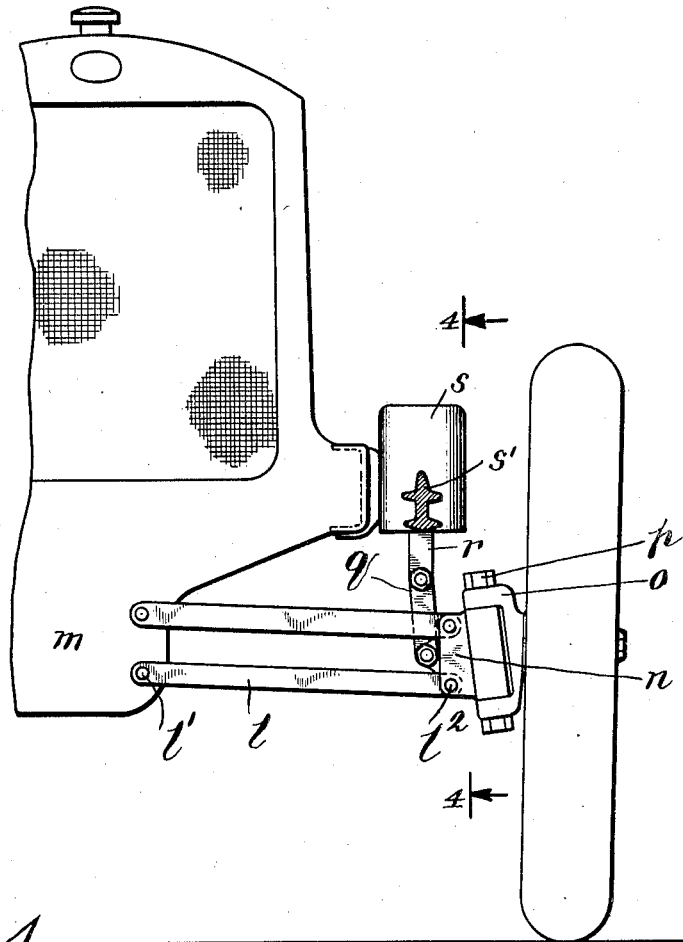
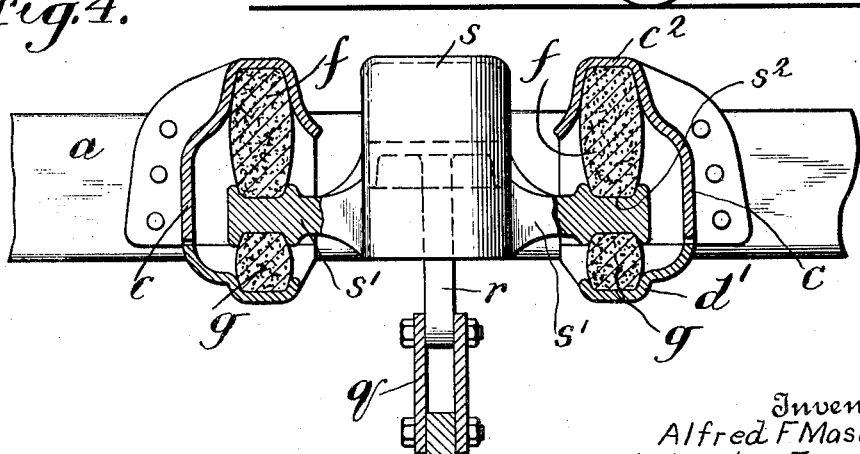
Inventor
Alfred F Masury
and Charles Froesch.
By their Attorneys Patented Nov. 2, 1926.

1,605,363

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed August 28, 1925. Serial No. 52,996.

This invention relates to the type of connection disclosed and claimed broadly in Letters Patent of the U. S. No. 1,404,876 dated January 31, 1922 in which non-metallic yielding material is interposed as the connector between two metallic parts of a vehicle. In the preferred embodiment of such patented cushion connection the load of one metal part is transmitted to the other metal part through a block or prism of rubber. Not only is the rubber subjected to compression by the load but it is preferred to confine it under internal static load through additional compression to thereby increase its life and resiliency. The present invention seeks to improve the usefulness of such a cushion connection under some conditions where either greater flexibility is desired or where a degree of instability in the rubber itself is mechanically advantageous. In accordance with the present invention advantage is taken of the known principles governing the action of columns under compression and such principles are applied in constructing a cushion connection which shall embody improved characteristics of a physical nature contributing to very special and useful results. To this end it is proposed to provide a prism of yielding non-metallic material for the transmission of load from one of the metal parts to the other which prism shall conform in its action to the action of long columns and which shall be designed to give that degree of instability for a predetermined load which is most useful. Further, the invention may provide for a long column of non-metallic yielding material in such relation to the connected parts that instability between the two is assured for a given load. Rubber columns can be successfully used in place of the load carrying blocks of the patented construction by taking advantage of the point of sudden collapse of such column to relieve the spring ends from extreme stresses and permit greater spring deflection without any further increase of the motion of the sprung weight in a motor vehicle under impact conditions and a construction which shall afford such relief is also an object of the present invention. This is accomplished by forming the housing within which the rubber column is retained with diverging walls with which the column may contact under varying degrees of collapse.

Due to its inherent qualities a rubber column, while acting as such, does not conform to the law of columns as understood and expressed in such formulas as have been deduced by Merriman or Euler which formulæ apply, of course, to the accepted conception of columns formed of steel, wood or the like. In order to derive a formula which could be used practically to determine the height of a column of rubber for a given collapse load, compression tests have been made with rubber columns of various cross sections and different values of slenderness ratio, the slenderness ratio, being of course, the length of the column divided by the radius of gyration of its section. Since rubber samples differ in their composition and method of manufacture any experimental results are, of course, only approximate. For instance, a round sample sawed from a slab of cold cured rubber shows the following results in a compression test:

Test log of round column sample (2" dia.)

| Column length | Applied load in pounds | Compressed length in inches |
|---|---|---|
| 11 inches | 20 | 10.81 |
| | 40 | 10.62 |
| | 60 | 10.56 |
| | 80 | 10.37 |
| | 100 | 10.25 |
| | 120 | 10.08 |
| | 122 | Collapse load |
| 10 inches | 20 | 9.75 |
| | 40 | 9.61 |
| | 60 | 9.47 |
| | 80 | 9.39 |
| | 100 | 9.26 |
| | 120 | 9.09 |
| | 140 | 8.95 |
| | 145 | Collapse load |
| 9 inches | 25 | 8.80 |
| | 50 | 8.64 |
| | 75 | 8.47 |
| | 100 | 8.34 |
| | 125 | 8.18 |
| | 150 | 8.01 |
| | 180 | Collapse load |
| 7¼ inches | 25 | 7.81 |
| | 50 | 7.68 |
| | 75 | 7.51 |
| | 100 | 7.39 |
| | 125 | 7.25 |
| | 150 | 7.16 |
| | 175 | ---------- |
| | 200 | 6.87 |
| | 225 | 6.68 |
| | 230 | Collapse load |
| 7 inches | 50 | 6.68 |
| | 100 | 6.43 |
| | 150 | 6.26 |
| | 200 | 6.03 |
| | 250 | 5.81 |
| | 275 | 5.64 |
| | 290 | Collapse load |

*Test log of round column sample (2″ dia.)*—Con.

| Column length | Applied load in pounds | Compressed length in inches |
|---|---|---|
| 6 inches | 50 | 5.72 |
|  | 100 | 5.53 |
|  | 150 | 5.36 |
|  | 200 | 5.16 |
|  | 250 | 4.97 |
|  | 300 | 4.81 |
|  | 350 | 4.62 |
|  | 373 | Collapse load |
| 5¼ inches | 100 | 4.62 |
|  | 200 | 4.31 |
|  | 300 | 4.01 |
|  | 400 | 3.73 |
|  | 485 | Collapse load |
| 4 inches | 100 | 3.68 |
|  | 200 | 3.43 |
|  | 300 | 3.22 |
|  | 400 | 2.98 |
|  | 500 | 2.75 |
|  | 600 | 2.39 |
|  | 700 | 2.14 |
|  | 800 | 2.03 |
|  | 900 | 1.91 |
|  | 1000 | 1.84 |
|  | 1100 | 1.76 |
|  | 1200 | 1.71 |

From these tests it was determined that although Merriman's definition of a column is a prism having a slenderness ratio of 25 or more, a rubber prism becomes a column when its slenderness ratio is more than 7½ to 8. The co-efficient of elasticity for rubber columns is easily determinable because for any actual load the column deflection can be measured and thus calculation of the flexural stresses involved is permitted. This is also unlike other materials where failure under stresses produced by combined compression and bending is a phenomena so complex that not even a purely theoretical formula can apply to all cases. It has been found that it is necessary to compress a short prism of rubber ($L/r$ equal to 8 or less) to approximately one half its original height before any permanent set occurs in the material. Thus it becomes an easy matter to accurately determine the modulus of elasticity (E) of cold cured rubber. "E" is the ratio of the unit-stress to the unit-elongation, that is $\frac{S}{s}$. Applying this formula to the round column tested we have:

| Column length. | Compression. | Unit elongation. | Units stress. | E |
|---|---|---|---|---|
| 11″ | .92″ | .0836 | 38.2 lbs. | 457 lb/sq. in. |
| 10″ | 1.05″ | .105 | 44.5 | 424 |
| 9″ | .99″ | .110 | 47.7 | 433 |
| 8″ | 1.32″ | .165 | 71.5 | 434 |
| 7″ | 1.34″ | .1915 | 87.6 | 457 |
| 6″ | 1.38 | .220 | 111.3 | 506 |
| 5″ | 1.27 | .254 | 127.3 | 501 |
| 4″ | 2.29 | .573 | 382 | 666 (Permanent set.) |

Average E=459 lbs.

The tests reveal that a unit compressive stress greater than 125 to 150 lbs. per sq. in. causes permanent setting of the rubber. This in confirmed by a calculation of the modulus of elasticity which becomes a rate instead of a constant beyond 150 lbs. per sq. in. If 10% is added to this average E as computed, which may be done on the theory that specimens which are molded rather than sawed from cold cured rubber have an increased surface resistance or skin toughness not present in hand made blocks, we have 459 plus 45.9 equals 504.9 lbs. per sq. inch or roughly 500 lbs. per sq. in. which may be used as the modulus of elasticity to derive the formula. The two most used formulæ in column investigation are Rankine's and Euler's. The former applies most generally to engineering problems and is known as the short column formula ($L/r$ of 40 or less) while Euler's is for the higher values of $L/r$. The foregoing data was obtained from tests conducted with columns having flat ends abutting on plane surfaces but not fixed and therefore the strength of a column of this type is approximately that of a fixed end column which is relatively short. Having this in mind and transposing the value of E which has just been derived as 500 in Euler's formula the following expression is obtained:

$$\text{Euler} = P = N\pi^2 E \frac{I}{l^2}$$

$$\text{Proposed formula} = P_c = N\pi^2 \, 500 \, \frac{I}{l^2}$$

Where
I = Least moment of inertia
$l$ = Length of the column
N = Constant depending upon the degree of fixity of the ends of the columns N = 4 in this case, and $$\text{Collapse load} = P_c = \pi^2 \frac{I}{l^2} 2000$$

From the foregoing discussion it may be conceded that the elastic limit of rubber under compression is reached when the rubber is compressed to one half its original length. This elastic limit is aproximately 135 lbs. per sq. in. for cold cured rubber. The modulus of elasticity for cold cured rubber is about 460, molded rubber is about 500.

Euler's formula for higher values of $\frac{L}{r}$ can be modified to apply to rubber columns of low values of $\frac{L}{r}$ or less. The proposed formula to determine the collapse load of rubber columns having flat or fixed ends is $$P_c = 2000\pi^2 \frac{I}{l^2}$$

The collapse curve of short rubber columns of $\frac{L}{r}$ equal to 25 or less has the same characteristics as that for long columns of other materials of $\frac{L}{r} = 80$ or more.

In the accompanying drawings there is illustrated a preferred embodiment of the invention and there will now be described an application of a column of rubber conforming to the formula hereinbefore deduced for long columns in a cushion connection for vehicle construction.

Figure 1 is a view in side elevation and partly in section showing the cushion connection according to the present invention under conditions of no load, that is, merely the normal load of the chassis, body and half spring weight.

Figure 2 is a view similar to Figure 1 but showing the connection under a condition of extreme stress as under impact conditions when the column of rubber is collapsed and co-operates with the walls of the housing to function as a cushion connection of the patented type.

Figure 3 is a view in front elevation showing a fragmentary portion of the front end of a motor vehicle in which springs are replaced by a pneumatic suspension to which the invention is applied.

Figure 4 is a fragmentary longitudinal view, partly in section, taken in the plane indicated by the line 4—4 in Figure 3 and looking in the direction of the arrows.

Referring to the figures one of the longitudinal side frame members of the vehicle chassis is indicated at $a$ and a vehicle leaf spring at $b$. Carried on the chassis frame member is a housing indicated in general at $c$ formed with an opening $c'$ in one side thereof through which the end of the leaf spring $b$ extends. The lower side of the housing is open and is adapted to be closed by a cover plate $d$ secured in place by bolts $e$ which are relied upon to exert the desired initial compression upon the yielding non-metallic material carried within the housing and engaging the end of the spring. On the end of the leaf spring $b$ is carried opposed seats $b'$, $b^2$. In the upper portion of housing $c$ there is formed a flat seating surface $c^2$ which is of substantially the same cross sectional area as the seat $b'$. A similar seat $d'$ is formed in the bottom of the closure $d$ and is similar in cross sectional area to the area of the seat $b^2$. Between the seats $c^2$ and $b'$ there is disposed a prism $f$ of yielding non-metallic material, such as rubber, of a cross sectional area normally equal to the area of the seats $c^2$, $b'$. This prism is normally of such length as to conform to the law for rubber columns hereinbefore derived, its length, of course, depending upon the other values in said formula. Between the seats $b^2$ and seat $d'$ there is disposed a prism or block $g$ of yielding non-metallic material which does not conform to the law of columns but on the contrary, functions as one of the blocks in the prior patented construction. The column $f$ serves as a load section, as will be understood, and the block $g$ as a rebound section. In the rear wall of the housing there is carried a thrust section $h$ having relatively thin extensions $h'$, $h'$ adapted to extend within recesses $c^3$ and $d^2$ formed in the housing and closure, respectively. The thrust section $h$ may be made slightly oversize so that upon insertion in the recesses the cushion may be spaced from the rear wall as at $h^2$ to increase the resiliency thereof. The seat $c^2$, as has been pointed out hereinbefore, is disposed at a sufficient height above the normal position of the spring seat $b'$ to permit the use of a prism conforming to the law of columns for rubber. From the seat $c^2$ the rear wall $c^4$ extends downwardly and rearwardly, diverging from a vertical plane for a purpose which will be better understood from an inspection of Figure 2 hereinafter more fully described. Similarly the front wall $c^5$ extends downwardly and forwardly and converges from a vertical plane in the same manner although not necessarily to the same degree as the wall $c^4$ but in the opposite direction.

When the vehicle is at rest, that is, standing still, the construction should be such that the axes of the prisms are vertical. With cushion connections according to the patented construction it is sometimes the practice to provide an inward offset as between the spring and bracket seats of the upper and lower blocks to prevent the blocks from being pulled out under maximum spring deflection. With the present construction, however, the permissible longitudinal motion of the spring ends is much greater thus reducing internal shearing stresses.

The housing walls are so shaped as to permit a variation of the slenderness ratio with increasing spring deflection thus automatically changing the point of collapse and relieving the most remote fibres from the neutral axis of excessive work. The degree of slant may be changed to vary the degree of instability thus obtaining any degree of deflection of the spring desired.

Figure 1 illustrates the column at rest and it will, of course, be understood that under conditions of load or under slight impact conditions the column $f$ will have a tendency to collapse or foreshorten and will bulge somewhat between its ends. Under conditions of extreme spring deflections resulting from maximum impact conditions the column will collapse as indicated in Figure 2 and will contact with both the front wall of the housing to a certain extent and will contact considerably with the rear wall to say the point $x$. This point will, of course, vary depending upon the degree of load placed upon the column and illustrates the manner in which the slenderness ratio is reduced with an increase in spring deflection. In the extreme position indicated in Figure 2 the effective length of the prism is practically from the point $x$ to the spring seat $b'$ and at this point the prism functions similarly to the prior patented construction. The front wall $c^5$ may be curved outwardly slightly to prevent crimping of the prism under load.

It will thus be seen that a cushion connection is provided which under normal stresses obeys the law of long columns while under conditions of extreme spring deflections functions as a cushion connection and is substantially stable.

It is to be understood that the invention is not confined to the application of this type of connection to a leaf spring but is equally applicable to a stiff member. Hydro-pneumatic suspensions have already been devised using a cylinder with a lever arm. The other end of such lever might advantageously be connected to a cushion connection of the character of the present invention to replace a leaf spring for while the resultant force acting on the rubber column is constantly changing its direction of application as the spring curvature changes with the use of a long lever the direction of this force may remain parallel to the axis of the rubber block and thus facilitate the action as a true column.

In Figures 3 and 4, a construction is illustrated in which the axle is replaced by stay rods $l$ pivoted at their inner ends as at $l'$ to the chassis $m$ of the motor vehicle and at their outer ends as at $l^2$ to a bracket $n$ upon which the steering knuckle $o$ is hinged by the king pin $p$. The bracket $n$ is connected by a link $q$ with the flange $r$ of a hydraulic or pneumatic cylinder $s$ which in this modification replaces the conventional spring. The cylinder $s$ is formed with diametrically disposed arms $s'$ extending in a longitudinal direction and formed with seats $s^2$ at their outer ends to co-operate with the seats $c^2$ and $d'$ formed in the housings $c$ which are carried with the longitudinal side frame member $a$ of the vehicle and which seats receive between them the cushioning blocks $f$ and $g$ hereinbefore described.

The stay rods $l$ are so arranged as to form a parallelogram when the wheel is deflected and thus constantly imparting to it a motion perpendicular to the road. It is possible to obtain with this combination a force on the columns of yielding non-metallic material almost constantly perpendicular to their normal section.

Various modifications may also be made in the configuration of the housing whereby varying results may be obtained and no limitation is intended by the illustrations or foregoing description except as indicated in the appended claims.

What we claim is:

1. A connection and support between metallic parts of a motor vehicle, one of which parts is to be connected to and supported by the other part comprising a block of yielding non-metallic material which obeys the law of long columns.

2. A connection and support between metallic parts of a motor vehicle, one of which parts is to be connected to and supported by the other part comprising a housing carried with one of the parts and formed with an opening in one side into which the other part extends, a block of yielding non-metallic material disposed between the last named part and the bottom of the housing, and a block of yielding non-metallic material between the last named part and the top of the housing which obeys the law of long columns.

3. A connection and support of the character described comprising a load section which functions according to the law of long columns, a rebound section which takes the form of a block of yielding non-metallic material and a separate thrust section.

4. A connection and support between metallic parts of a motor vehicle, one of which parts is to be connected to and supported by the other part comprising a housing carried with one of the parts and formed with an opening in one side into which the other part extends, a block of yielding non-metallic material disposed between the last named part and the bottom of the housing, and a block of yielding non-metallic material between the last named part and the top of the housing which obeys the law of long columns, the top of said housing being formed with a seat equal to the cross sectional area of the long column and the sides of said housing diverging from the seat.

5. A connection and support between metallic parts of a motor vehicle, one of which parts is to be connected to and supported by the other part comprising a prism of yielding non-metallic material having a slenderness ratio in excess of seven and one-half.

6. A connection and support between metallic parts of a motor vehicle, one of which parts is to be connected to and supported by the other part comprising a prism whereof the collapse load equals $$2000\pi^2 \frac{I}{l^2}.$$

7. A connection and support between metallic parts of a motor vehicle, one of which parts is to be connected to and supported by the other part comprising a prism of yielding non-metallic material and means to cause said prism to obey the law of long columns under normal load conditions and means to utilize said prism under the collapse load of the material.

This specification signed this 18th day of August A. D. 1925.

ALFRED F. MASURY.
CHARLES FROESCH.